United States Patent
Lee et al.

(10) Patent No.: US 7,061,566 B2
(45) Date of Patent: Jun. 13, 2006

(54) IN-PLANE SWITCHING MODE LIQUID CRYSTAL DISPLAY DEVICE AND METHOD OF FABRICATING THE SAME

(75) Inventors: Joun-Ho Lee, Gyoungsangnam-Do (KR); Chung-Sun Lim, Seoul (KR)

(73) Assignee: LG.Philips LCD Co., Ltd, Seoul (KR)

( * ) Notice: Subject to any disclaimer, the term of this patent is extended or adjusted under 35 U.S.C. 154(b) by 28 days.

(21) Appl. No.: 10/646,727

(22) Filed: Aug. 25, 2003

(65) Prior Publication Data

US 2004/0041970 A1    Mar. 4, 2004

(30) Foreign Application Priority Data

Aug. 27, 2002    (KR)    ...................... 10-2002-0050964

(51) Int. Cl.
*G02F 1/1343*    (2006.01)
(52) U.S. Cl. ...................................................... 349/141
(58) Field of Classification Search ................. 349/141
See application file for complete search history.

(56) References Cited

U.S. PATENT DOCUMENTS

| | | | |
|---|---|---|---|
| 5,598,285 A | 1/1997 | Kondo et al. | |
| 5,838,037 A | 11/1998 | Masutani et al. | |
| 5,946,060 A | 8/1999 | Nishiki et al. | |
| 5,990,987 A | 11/1999 | Tanaka | |
| 6,028,653 A | 2/2000 | Nishida | |
| 6,069,678 A * | 5/2000 | Sakamoto et al. | 349/141 |
| 6,097,454 A | 8/2000 | Zhang et al. | |
| 6,259,200 B1 * | 7/2001 | Morita et al. | 313/498 |
| 6,266,166 B1 | 7/2001 | Katsumata et al. | |
| 6,525,788 B1 * | 2/2003 | Nakagawa et al. | 349/44 |
| 6,587,162 B1 * | 7/2003 | Kaneko et al. | 349/43 |
| 6,614,494 B1 * | 9/2003 | Kawai et al. | 349/54 |

(Continued)

FOREIGN PATENT DOCUMENTS

| | | |
|---|---|---|
| JP | 9-5764 | 1/1997 |
| JP | 9-73101 | 3/1997 |

OTHER PUBLICATIONS

R. Kiefer et al., "In-Plane Switching of Nematic Liquid Crystals", Japan Display '92, pp. 547-550.
M. Oh-e et al., "Principles and Characteristics of Electro-Optical Behaviour With In-Plane Switching Mode", Asia Display '95, pp. 577-580.

(Continued)

*Primary Examiner*—Kenneth Parker
(74) *Attorney, Agent, or Firm*—McKenna Long & Aldridge LLP

(57) ABSTRACT

An in-plane switching liquid crystal display device includes a first substrate and a second substrate, a gate line and a data line on the first substrate to define a pixel region, a floating line adjacent to a lower portion of the data line, a thin film transistor at an intersection between the gate and data lines, a passivation layer on the thin film transistor and the pixel region, a common electrode overlapping the data line, a pixel electrode separated from the common electrode at a predetermined interval, and a liquid crystal layer between the first and second substrates.

19 Claims, 6 Drawing Sheets

U.S. PATENT DOCUMENTS

| | | | |
|---|---|---|---|
| 6,744,482 B1* | 6/2004 | Matsumoto et al. | 349/141 |
| 2002/0008799 A1* | 1/2002 | Ota et al. | 349/43 |
| 2002/0159016 A1* | 10/2002 | Nishida et al. | 349/141 |
| 2003/0103181 A1* | 6/2003 | Imayama et al. | 349/122 |

OTHER PUBLICATIONS

M. Ohta et al., "Development of Super-TFT-LCDs With In-Plane Switching Display Mode", Asia Display '95, pp. 707-710.

S. Matsumoto et al., "Display Characteristics of In-Plane-Switching (IPS) LCDs and a Wide-Viewing-Angle", Euro Display '96, pp. 445-448.

H. Wakemoto et al., "An Advanced In-Plane Switching Mode TFT-LCD", SID 97 Digest, pp. 929-932.

S. H. Lee et al., "High-Transmittance, Wide-Viewing-Angle Nematic Liquid Crystal Display Controlled by Fringe-Field Switching", Asia Display '98, pp. 371-374.

* cited by examiner

IN-PLANE SWITCHING MODE LIQUID CRYSTAL DISPLAY DEVICE AND METHOD OF FABRICATING THE SAME

The present invention claims the benefit of Korean Patent Application No. 50964/2002 filed in Korea on Aug. 27, 2002, which is hereby incorporated by reference.

BACKGROUND OF THE INVENTION

1. Field of the Invention

The present invention relates to a liquid crystal display device and a method of fabricating a liquid crystal display device, and more particularly, to an in-plane switching mode liquid crystal display device and a method of fabricating an in-plane switching mode liquid crystal display device.

2. Description of the Related Art

In general, a liquid crystal display (LCD) device is capable of adjusting light transmission ratios of liquid crystal cells to display image data by individually supplying data signals corresponding to the image data to the liquid crystal cells. Accordingly, the LCD device includes a liquid crystal display panel in which liquid crystal cells are aligned in a matrix configuration and a driver integrated circuit (IC).

The liquid crystal display panel includes a color filter substrate and a thin film transistor (TFT) array substrate that oppose each other and a liquid crystal layer between the color filter substrate and the TFT array substrate. The TFT array substrate includes data lines for transmitting data signals supplied from a data driver IC to the liquid crystal cells and orthogonal gate lines for transmitting scan signals supplied from a gate driver IC, wherein the liquid crystal cells are defined at intersections of the data lines and gate lines. The gate driver IC sequentially supplies scan signals to the gate lines to sequentially select liquid crystal cells on a one by one basis. In addition, the data driver IC supplies data signals to the liquid crystal cells of selected gate lines.

Although twisted nematic mode LCD devices are commonly used as high definition display devices having low power consumption, they have a narrow viewing angle. This is due to refractive anisotropy of liquid crystal molecules, wherein the liquid crystal molecules aligned in parallel to the substrate are aligned almost vertically to the substrate when a voltage is supplied to the LCD panel. Accordingly, in-plane switching mode LCD devices have been developed to overcome this disadvantage.

Generally, the in-plane switching mode LCD devices include an upper substrate having color filters, a lower substrate having TFTs, a common electrode, pixel electrodes, and a liquid crystal layer formed between the upper and lower substrates.

FIG. 1 is a plan view of an in-plane switching mode liquid crystal display (LCD) device according to the related art. In FIG. 1, a pixel region is defined by arranging a plurality of gate lines 1 along a first direction and a plurality of data lines 2 along a second direction perpendicular to the first direction. In general, an N×M matrix of pixels are formed such that an N-number of gate lines 1 and an M-number of data lines 2 are provided on a substrate. A TFT composed of a gate electrode 5, a semiconductor layer 15, and source/drain electrodes 6a and 6b is disposed at each intersection between the gate and data lines 1 and 2, and a common line 3 is arranged in the pixel region approximately parallel to the gate line 1. In addition, pixel and common electrodes 8 and 9 are arranged in parallel to each other for switching the liquid crystal molecules of the LCD device. The pixel electrode 8 is connected to the drain electrode 6b of the TFT and the common electrode 9 is connected to the common line 3. Accordingly, a voltage is supplied through the TFT and a lateral electric field is generated between the pixel electrode 8 and the common electrode 9.

FIG. 2 is a cross sectional view along I–I' of FIG. 1 according to the related art. In FIG. 2, the LCD device includes a TFT substrate 10 having the TFT formed on a transparent substrate 7, the common electrode 9, and the pixel electrode 8, and a color filter substrate 20 having a light-shielding layer (i.e., black matrix) 21, a color filter 23, and a overcoat layer 25. In addition, a liquid crystal layer 30 is formed between the TFT substrate 10 and the color filter substrate 20, and a spacer 31 is positioned in the liquid crystal layer 30 to maintain a uniform cell gap between the TFT and color filter substrates 10 and 20.

The TFT includes a gate electrode 5, source/drain electrodes 6a and 6b, a semiconductor layer 15, and an ohmic contact layer 14. In addition, a gate insulating layer 11 is formed between the gate electrode 5 and the semiconductor layer 15.

Within the pixel region, the common electrode 9, which is formed together with the gate electrode 5 of the TFT, and a pixel electrode 8, which is formed together with the source/drain electrodes 6a and 6b, are formed at a predetermined interval, and a passivation layer 13 is formed over an entire surface of the TFT and an upper portion of the pixel region. However, since the pixel electrode 8 and the common electrode 9 are formed on the same substrate, an aperture ratio of the LCD device is degraded. For example, since the pixel electrode 8 and the common electrode 9 are made of opaque metal materials, light is not transmitted from a backlight device within a region where the pixel and common electrodes 8 and 9 are formed. Accordingly, an area of the opening portion is reduced by an area corresponding to the the pixel and common electrodes 8 and 9. In order to solve the problem, the aperture ratio is improved by forming the common electrode 9 and the pixel electrode 8 of transparent materials.

FIG. 3 is a plan view of another in-plane switching mode liquid crystal display device according to the related art, and FIG. 4 is a cross sectional view along II–II' of FIG. 3 according to the related art. In FIGS. 3 and 4, an aperture ratio can be improved by forming pixel and common electrodes 18 and 19 positioned within a pixel region of transparent materials. In addition, a passivation layer 13 may be formed of organic materials having low dielectric constants between the data line 2 and the common electrode 19. Accordingly, the common electrode 19 is formed along a boundary of two adjacent pixel electrodes 18, such as an upper portion of the data line 2, and generates a lateral electric field (solid line) between the two adjacent pixel electrodes 18.

However, as shown in FIG. 4, the data line 2 positioned in a lower portion of the common electrode 19 generates another electric field (dotted line) with the pixel electrode 18 that is adjacent to the common electrode 19. Accordingly, the data line distorts the lateral electric field between the common electrode 19 and the pixel electrode 18. Thus, light leaks along a marginal region of the pixel electrode 18 between the data line 2 and the adjacent pixel electrode 18, thereby generating cross-talk on a display screen.

SUMMARY OF THE INVENTION

Accordingly, the present invention is directed to an in-plane switching mode liquid crystal display device and a method of fabricating an in-plane switching mode liquid crystal display device that substantially obviates one or more of the problems due to limitations and disadvantages of the related art.

An object of the present invention is to provide an in-plane switching liquid crystal display device capable of forming a uniform lateral electric field between a common electrode and a pixel electrode.

Another object of the present invention is to provide a method of fabricating an in-plane switching liquid crystal display device capable of forming a uniform lateral electric field between a common electrode and a pixel electrode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, an in-plane switching liquid crystal display device includes a first substrate and a second substrate, a gate line and a data line on the first substrate to define a pixel region, a floating line adjacent to a lower portion of the data line, a thin film transistor at an intersection between the gate and data lines, a passivation layer on the thin film transistor and the pixel region, a common electrode overlapping the data line, a pixel electrode separated from the common electrode at a predetermined interval, and a liquid crystal layer between the first and second substrates.

In another aspect, an in-plane switching liquid crystal display device includes a first substrate and a second substrate, a gate line and a data line on the first substrate to define a pixel region, a common line parallel to the gate line, a floating line overlapping the data line and formed on a same plane as the gate line, a thin film transistor at an intersection between the gate and data lines, an organic passivation layer on the thin film transistor and the pixel region, a common electrode on the passivation layer overlapping the data line, a pixel electrode on the passivation layer to cross the common electrode, and a liquid crystal layer between the first and second substrates.

In another aspect, a method of fabricating an in-plane switching liquid crystal display device includes providing first and second substrates having pixel regions, forming a gate line and a floating line on a first substrate, forming a data line to overlap the floating line, forming a thin film transistor at an intersection of the gate and data lines, forming a passivation layer on the thin film transistor and the pixel region, forming a common electrode to overlap the data line and a pixel electrode on the passivation layer, and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the embodiments of the present invention, examples of which are illustrated in the accompanying drawings.

Figure 1:
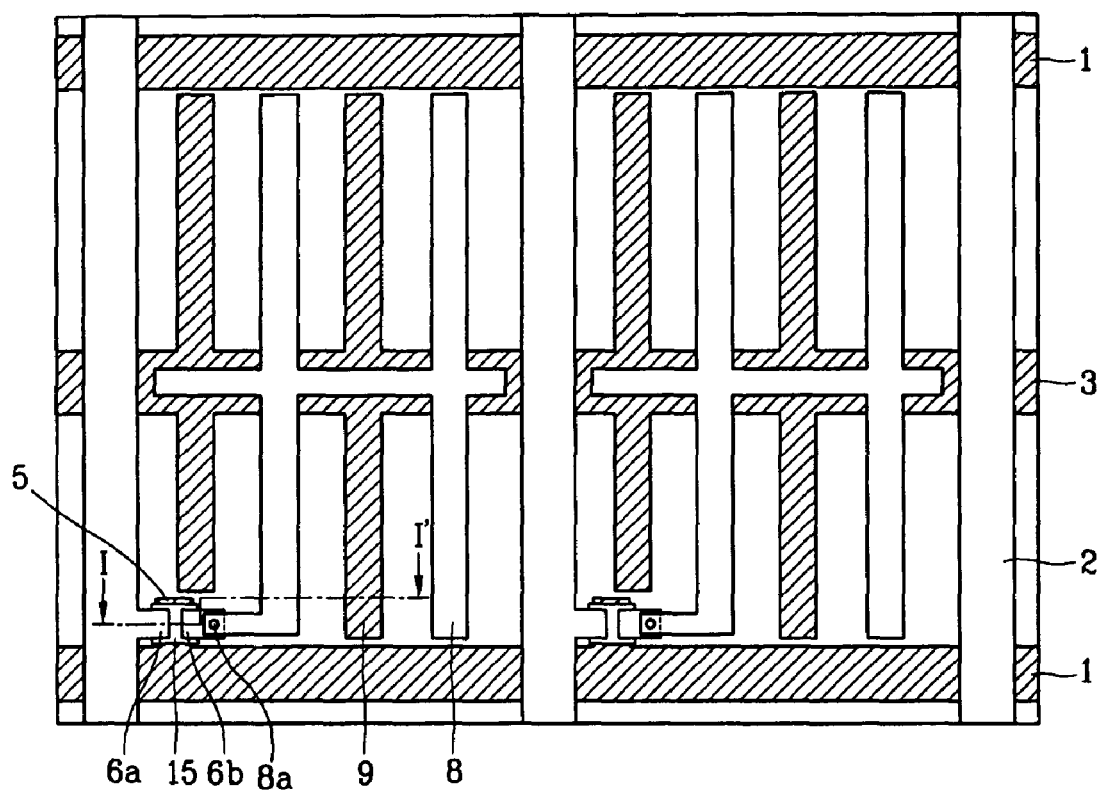
FIG. 1 is a plan view of an in-plane switching mode liquid crystal display device according to the related art.
Figure 2:
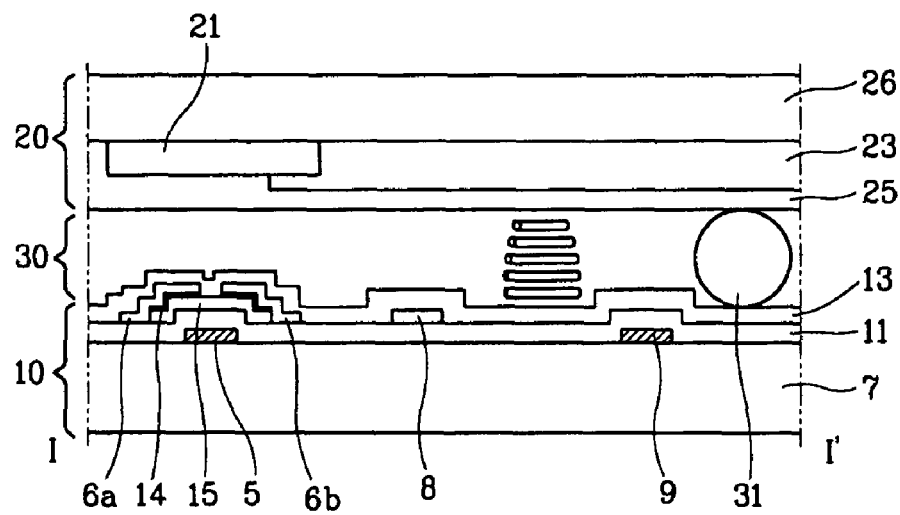
FIG. 2 is a cross sectional view along I–I' of FIG. 1 according to the related art.
Figure 3:
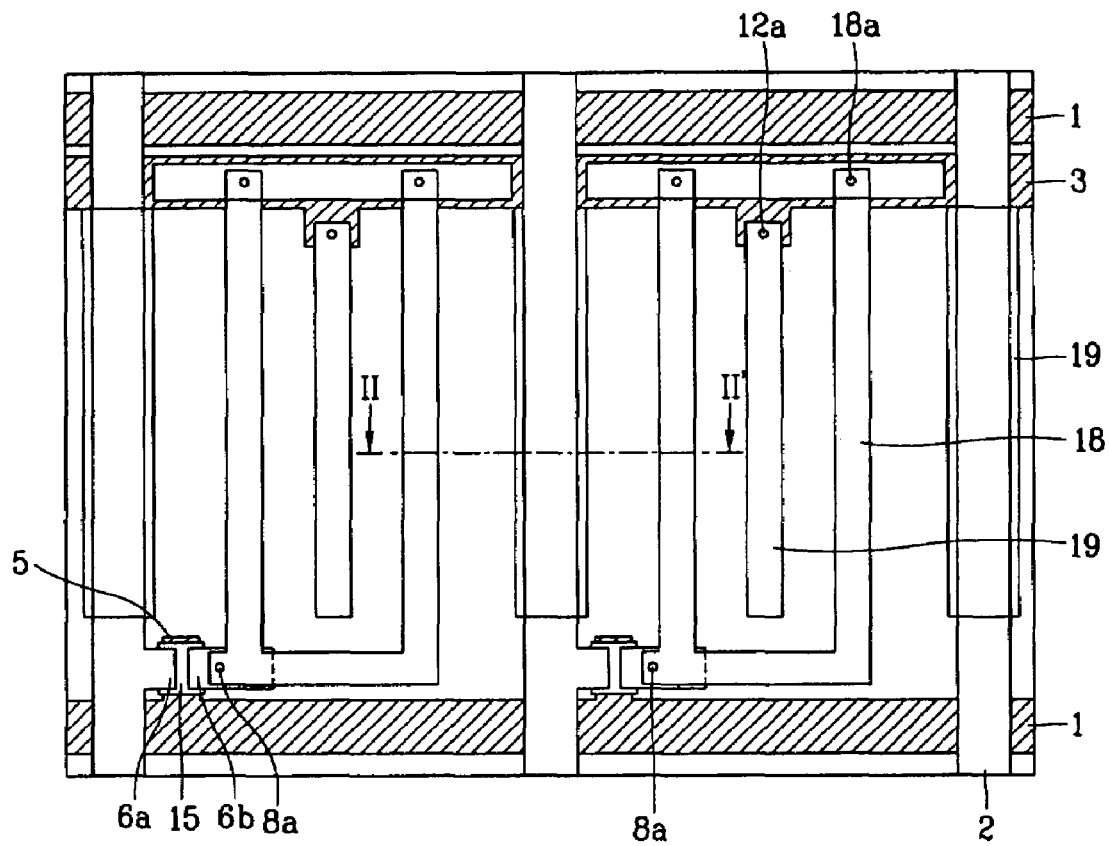
FIG. 3 is a plan view of another in-plane switching mode liquid crystal display device according to the related art.
Figure 4:
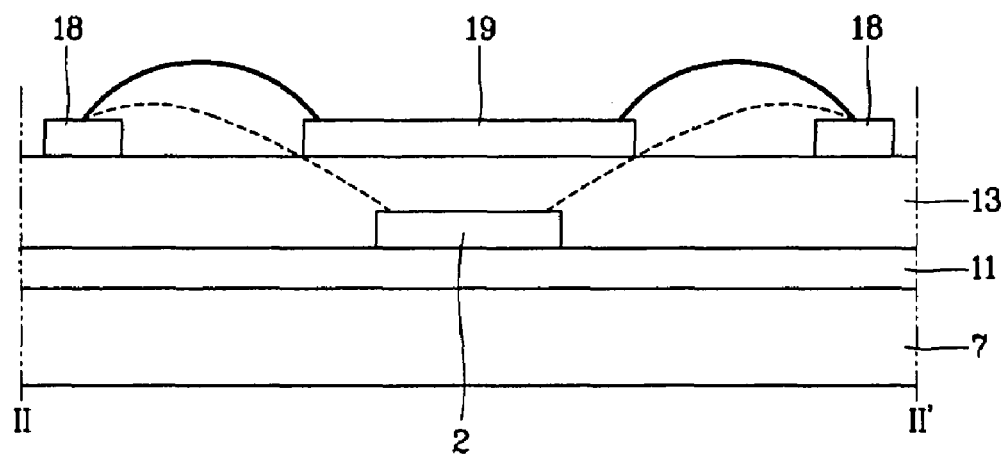
FIG. 4 is a cross sectional view along II–II' of FIG. 3 according to the related art.
Figure 5:
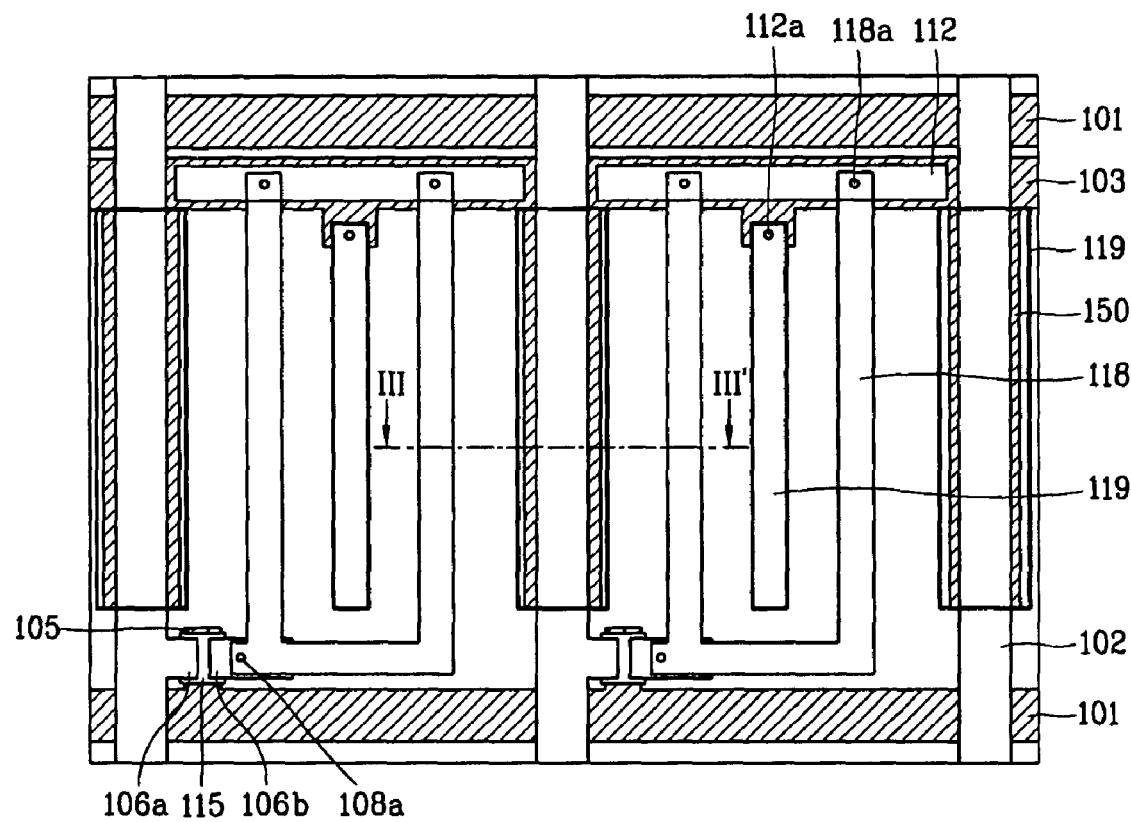
FIG. 5 is a plan view of an exemplary in-plane switching mode liquid crystal display device according to the present invention.

FIG. 5 is a plan view of an exemplary in-plane switching mode liquid crystal display device according to the present invention. In FIG. 5, an in-plane switching mode LCD device may include a plurality of pixel regions defined by a plurality of gate lines 101 arranged along a first direction, a plurality of data lines 102 arranged along a second direction perpendicular to the first direction, and a common line 103 disposed in parallel to the gate lines 101.

In addition, one or more common electrodes 119 may be electrically connected to the common line 103 through a first contact hole 112a. Accordingly, the common electrode 119 may be formed to overlap the data line 102, thereby generating a lateral electric field between two adjacent pixel electrodes 118, which may be positioned at a predetermined interval from the common electrode 119.

A thin film transistor composed of a gate electrode 105 that diverges from the gate line 101, a source electrode 106a that diverges from the data line 102, a drain electrode 106b, and a semiconductor layer 115 may be positioned at an intersection between the gate and data lines 101 and 102, wherein the drain electrode 106b may be connected with the pixel electrode 118 through a second contact hole 108a. Accordingly, the pixel electrode 118 may be connected with source/drain electrode lines 112 that are formed to overlap the common line 103 through a third contact hole 118a. Thus, the source/drain electrode line 112 and the common line 103, which is formed at a lower portion thereof, may form a capacitor using a gate insulating layer (not shown) disposed therebetween.

A floating line 150 of two stems may be formed in the lower portion of the data line 102 on the gate insulating layer (not shown). The floating line 150 may be formed together with the gate line 101 in order to uniformly form a lateral electric field between pixel electrode 118 and the common electrode 119 that overlaps the data line 102. Accordingly, a data signal passing through the data line 102 may be coupled with the pixel electrode 118 that is adjacent to the common electrode 119. Thus, the floating line 150 can intercept the data signal to prevent any adverse effects.

Figure 6:
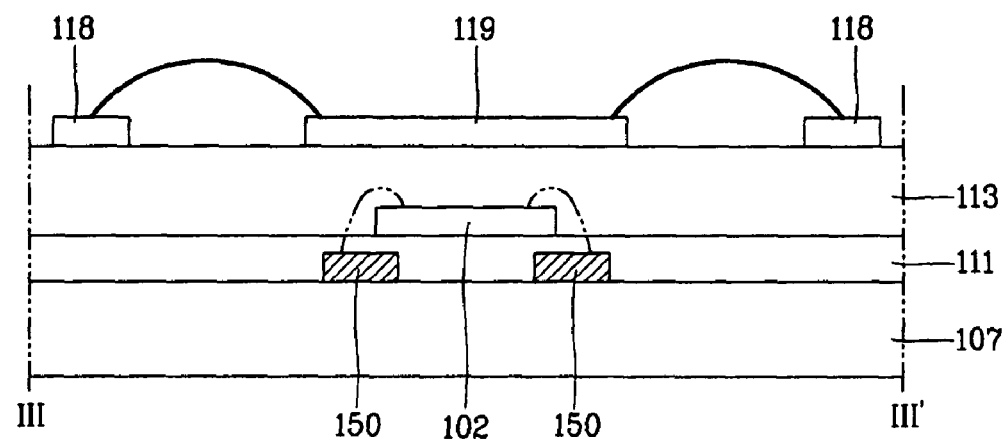
FIG. 6 is a cross sectional view along III–III' of FIG. 5 according to the present invention.

FIG. 6 is a cross sectional view along III–III' of FIG. 5 according to the present invention. In FIG. 6, the floating line 150 and the data line 102 may be formed in parallel on a transparent substrate 107 over the gate insulating layer 111, wherein the floating line 150 may prevent signals transmitted along the data line 102 from interfering with the pixel electrode 118 adjacent to the common electrode 119, which is at an upper portion of the data line 102. In addition, a passivation layer 113 may be disposed between the data line 102 and the common electrode 119, wherein the passivation layer 113 may be formed of organic materials having low dielectric constants. The floating line 150 may be formed along an inner portion of the common electrode 119 to intercept the signals transmitted along the data line 102.

The common electrode 119 and the pixel electrode 118, which are formed on the passivation layer 113, may be formed of transparent materials, such as indium tin oxide (ITO) or indium zinc oxide (IZO). In addition, the floating line 150 may be formed with gate electrode materials, and may be formed with two lines along both sides of a lower portion of the data line 102 to couple the signals transmitted along the data line 102.

Figure 7:
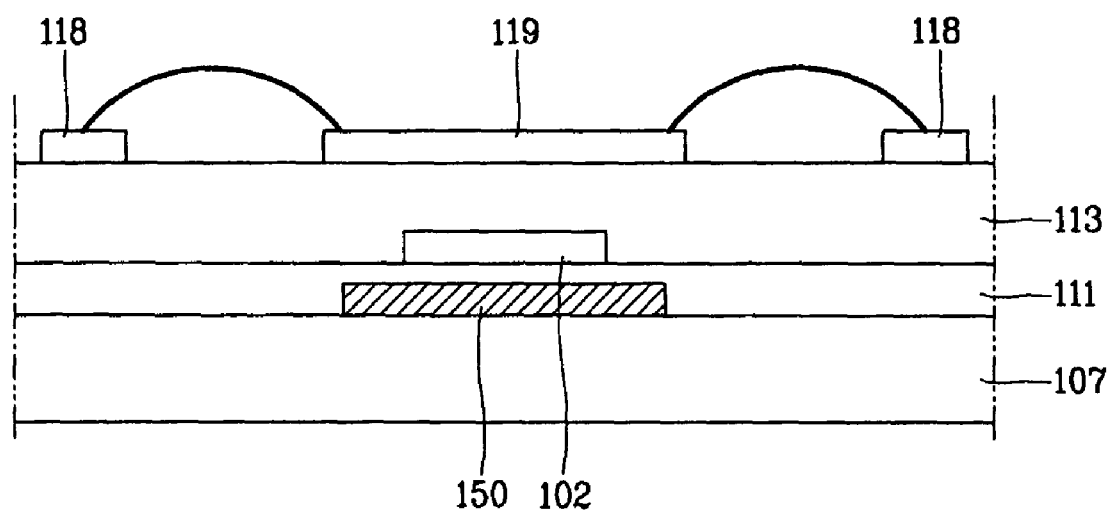
FIG. 7 is a cross sectional view another exemplary in-plane switching mode liquid crystal display device according to the present invention.

FIG. 7 is a cross sectional view another exemplary in-plane switching mode liquid crystal display device according to the present invention. In FIG. 7, a floating line 150 may be formed along a lower portion of a data line 102 and may be formed as a single conductive line. Accordingly, the signals transmitted along the data line 102 may be intercepted by increasing a width of the common electrode 119 that overlaps the data line 102 instead of forming the floating line 150. In addition, the data line 102 may have a first width, the floating line may have a second width larger than the first width, and the common electrode 119 may have a third width larger than the first and second widths.

Figure 8A:
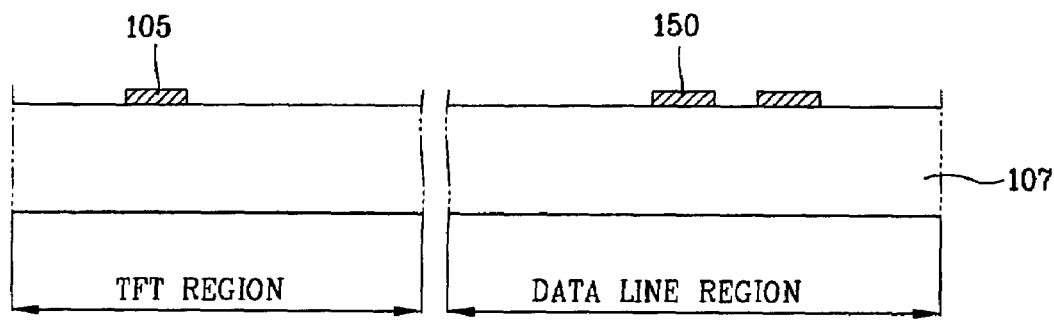
FIGS. 8A to 8E are cross sectional views of an exemplary method of fabricating an in-plane switching mode liquid crystal display device according to the present invention.

FIGS. 8A to 8E are cross sectional views of an exemplary method of fabricating an in-plane switching mode liquid crystal display device according to the present invention. In FIG. 8A, a metal material, such as Al, Mo, Ti, Cu, Ta, or an Al alloy, may be deposited onto a transparent substrate 107 using a sputtering method. Then, a gate electrode 105 of a TFT within a TFT region and a floating line 150 may be formed by patterning the metal material within data line region. Accordingly, a gate line 101 and the common line 103 may be formed simultaneously, as shown in FIG. 5.

Figure 8B:
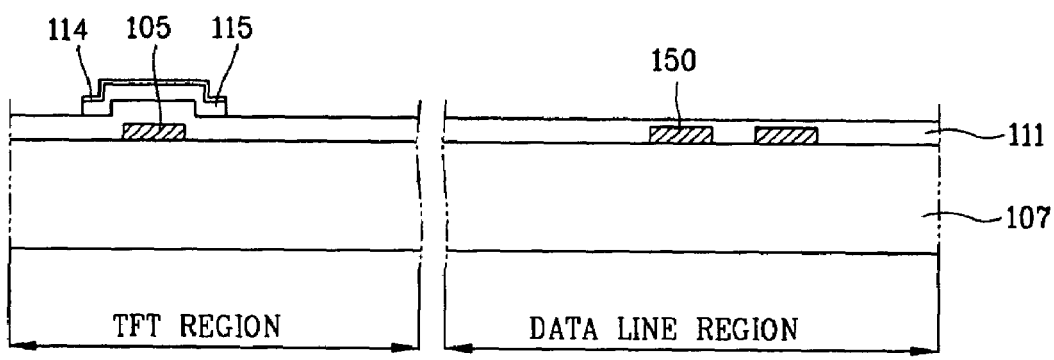

In FIG. 8B, SiNx and/or SiOx may be deposited over the gate electrode 105 and an entire surface of the substrate 107 using a plasma chemical vapor deposition (CVD) method, thereby forming a gate insulating layer 111. Then, a semiconductor layer 115 and an ohmic contact layer 114 may be formed by depositing and patterning amorphous silicon and n+ amorphous silicon formed over the gate insulating layer 111.

Figure 8C:
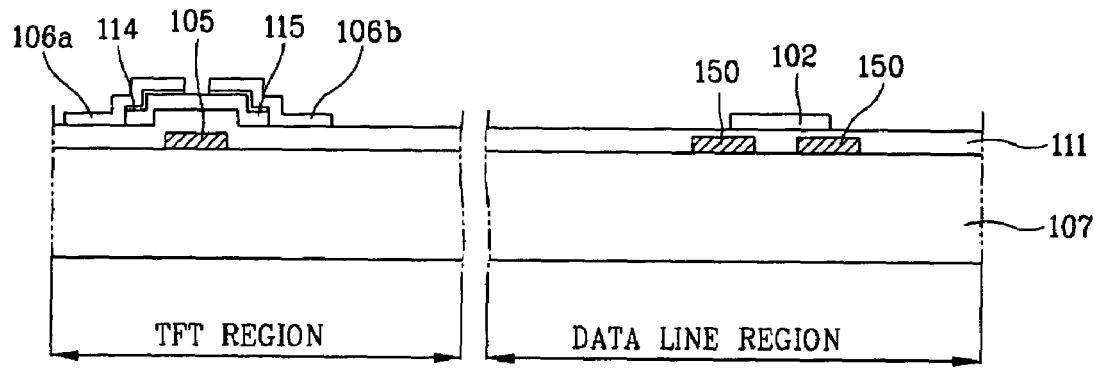

In FIG. 8C, metal material(s), such as Al, Mo, Ti, Cu, Ta, or and Al alloy, may be deposited on the transparent substrate 107 using a sputtering method. Then, the metal material(s) may be patterned to form source/drain electrodes 106a and 106b of the TFT and a data line 102. Next, the ohmic contact layer 114 formed between the source electrode 106a and the drain electrode 106b may be removed by using the source/drain electrodes 106a and 106b as masks, thereby exposing a portion of the semiconductor layer 115.

Figure 8D:
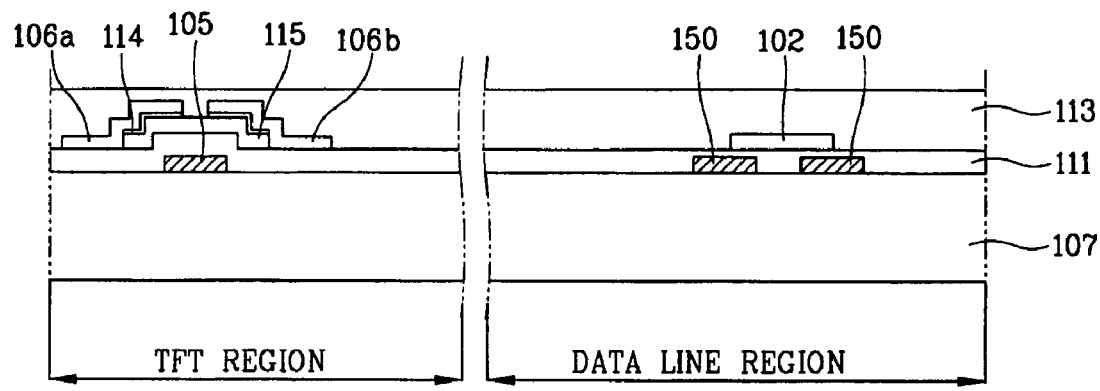

In FIG. 8D, a passivation layer 113 may be formed by depositing organic material(s), such as benzocyclobutene (BCB) or acryl, over an entire surface of the upper portion of the gate insulating layer 111 of the source/drain electrodes 106a and 106b and the data line 102.

Figure 8E:
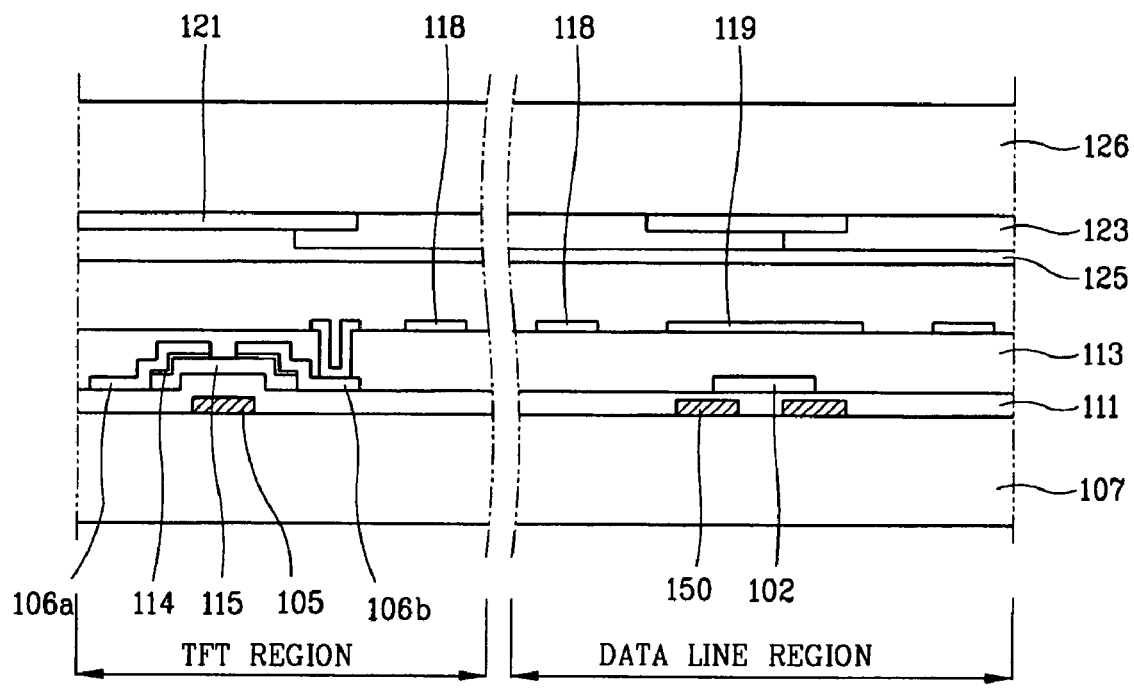

FIG. 8E, indium tin oxide (ITO) and/or indium zinc oxide (IZO) may be deposited on the passivation layer 113 using a sputtering method. Then, a common electrode 119 connected to the common line and a pixel electrode 118 connected to the drain electrode 106b of the TFT may be formed by patterning. Accordingly, the common electrode 119 and the pixel electrode 118 may be formed to cross each other at a predetermined interval, and the common electrode 119 may be formed to overlap the data line 102. Then, a black matrix 121 and a color filter 123 may be formed on a transparent substrate 126, and an over-coating layer 125 may be formed thereon and attached with the TFT substrate. Accordingly, the black matrix 121 may be formed within a region corresponding to the TFT, the gate line, and the data line 102 formed on the TFT substrate.

It will be apparent to those skilled in the art that various modifications and variations can be made in the in-plane switching mode liquid crystal display device and a method of fabricating an in-plane switching mode liquid crystal display device of the present invention without departing from the spirit or scope of the invention. Thus, it is intended that the present invention cover the modifications and variations of this invention provided they come within the scope of the appended claims and their equivalents.

What is claimed is:

1. An in-plane switching liquid crystal display device, comprising:
   a first substrate and a second substrate;
   a gate line and a data line on the first substrate to define a pixel region;
   a floating line including at least two conductive lines adjacent to a lower portion of the data line, wherein a part of the floating line is overlapped with the data line;
   a thin film transistor at an intersection between the gate and data lines;
   a passivation layer on the thin film transistor and the pixel region;
   a common electrode overlapping the data line;
   a pixel electrode separated from the common electrode at a predetermined interval; and
   a liquid crystal layer between the first and second substrates.

2. The device according to claim 1, wherein the thin film transistor includes:
   a gate electrode on the first substrate;
   a gate insulating layer on the gate electrode;
   a semiconductor layer on the gate insulating layer;
   an ohmic contact layer on the semiconductor layer; and
   source and drain electrodes on the ohmic contact layer.

3. The device according to claim 1, further comprising a common line positioned in parallel to the gate line.

4. The device according to claim 1, wherein the common electrode and the pixel electrode are formed on a same plane.

5. The device according to claim 1, wherein the common electrode and the pixel electrode are formed on the passivation layer.

6. The device according to claim 1, wherein the common electrode and the pixel electrode include transparent materials.

7. The device according to claim 6, wherein the transparent materials include at least one of indium tin oxide (ITO) and indium zinc oxide (IZO).

8. The device according to claim 1, wherein the passivation layer includes at least one of benzocyclobutene (BCB) and acryl.

9. The device according to claim 1, wherein a width of the floating line is larger than a width of the data line.

10. The device according to claim 9, wherein a width of the common electrode is larger than the width of the floating line.

11. The device according to claim 1, wherein the floating line and the gate line are simultaneously formed.

12. The device according to claim 1, further comprising a black matrix and a color filter on the second substrate.

13. An in-plane switching liquid crystal display device, comprising:
   a first substrate and a second substrate;
   a gate line and a data line on the first substrate to define a pixel region;
   a common line parallel to the gate line;
   a floating line including at least two conductive lines overlapping the data line and formed on a same plane as the gate line;
   a thin film transistor at an intersection between the gate and data lines;
   an organic passivation layer on the thin film transistor and the pixel region;
   a common electrode on the passivation layer overlapping the data line;
   a pixel electrode on the passivation layer to cross the common electrode; and
   a liquid crystal layer between the first and second substrates.

14. A method of fabricating an in-plane switching liquid crystal display device, comprising:
   providing first and second substrates having pixel regions;
   forming a gate line and a floating line including at least two conductive lines on the first substrate;
   forming a data line to overlap the floating line;
   forming a thin film transistor at an intersection of the gate and data lines;
   forming a passivation layer on the thin film transistor and the pixel regions;
   forming a common electrode to overlap the data line and a pixel electrode on the passivation layer; and
   forming a liquid crystal layer between the first and second substrates.

15. The method according to claim 14, wherein the forming of the thin film transistor includes:
   forming a gate electrode on the first substrate;
   forming a gate insulating layer on the gate electrode;
   forming an active layer on the gate insulating layer;
   forming an ohmic contact layer on the active layer to expose a center portion of the active layer; and
   forming source and drain electrodes on the ohmic contact layer.

16. The method according to claim 14, further comprising forming a black matrix and a color filter on the second substrate.

17. The method according to claim 14, wherein a width of the floating line is larger than a width of the data line.

18. The method according to claim 17, wherein a width of the common electrode is larger than the width of the floating line.

19. The device according to claim 1, wherein the common electrode laterally encircles the pixel electrode.

* * * * *